United States Patent [19]
Posselius et al.

[11] Patent Number: 6,083,103
[45] Date of Patent: Jul. 4, 2000

[54] SENSOR APPARATUS WITH BUTTERFLY VALVE FOR MAINTAINING PACKING DENSITY OF MOVING MATERIAL

[75] Inventors: John H. Posselius, Ephrata; Mark O. Gardner, Denver, both of Pa.

[73] Assignee: New Holland North America, Inc., New Holland, Pa.

[21] Appl. No.: 09/030,024

[22] Filed: Feb. 25, 1998

[51] Int. Cl.$^7$ .............................. A01D 17/02; A01F 12/46
[52] U.S. Cl. .................. 460/114; 56/10.2 B; 56/DIG. 15
[58] Field of Search ............................ 56/10.2 A, 10.2 R, 56/10.2 B, DIG. 15; 460/114, 115, 7, 6, 1; 198/573, 608

[56] References Cited

U.S. PATENT DOCUMENTS

| | | | |
|---|---|---|---|
| 4,337,611 | 7/1982 | Mailander et al. | 56/10.2 |
| 4,337,729 | 7/1982 | Peppler et al. | 119/52 B |
| 4,556,192 | 12/1985 | Rarmisch | 251/58 |
| 4,614,213 | 9/1986 | Englin | 141/59 |
| 5,067,506 | 11/1991 | Ball et al. | 137/1 |
| 5,092,819 | 3/1992 | Schroeder et al. | 460/7 |
| 5,106,339 | 4/1992 | Braun et al. | 460/7 |
| 5,351,708 | 10/1994 | Donato et al. | 137/68.1 |
| 5,355,673 | 10/1994 | Sterling et al. | 60/324 |
| 5,546,904 | 8/1996 | Papenhagen et al. | 123/400 |
| 5,809,965 | 8/1998 | Atanasyan | 123/339.15 |

OTHER PUBLICATIONS

Hamid, Abdul et al. "Microwave Doppler–Effect Flow Monitor" IEEE Transactions on Industrial Electronics and Control Instrumentation, vol. IECI–22, No. 2, May 1975, pp. 224–228.

*Primary Examiner*—Thomas B. Will
*Assistant Examiner*—Arpad Fabian Kovacs
*Attorney, Agent, or Firm*—Griffin, Butler, Whisenhunt & Szipl, LLP

[57] ABSTRACT

In an agricultural harvester, a characteristic of crop material is sensed as the crop material is moved through a feed tube by an auger having flighting which terminates upstream of a sensing region. The auger flighting conveys crop material into the sensing region where it accumulates and then is pushed from the sensing region by further crop material conveyed into the region. This results in a more uniform packing density of the crop material in the sensing region where the measurement is made, provided the feed tube is oriented vertically or at a small angle relative to vertical. To obtain a uniform packing density when the feed tube is horizontal or inclined only slightly, a butterfly valve is provided downstream of the sensing region. The valve has flaps that are spring biased to a closed position to block the flow of crop material from the sensing region. When the crop material in the sensing region is packed to a sufficient density, the pressure of the crop material acting against the flaps overcomes the spring bias and the valve opens to permit flow of the crop from the sensing region.

20 Claims, 3 Drawing Sheets

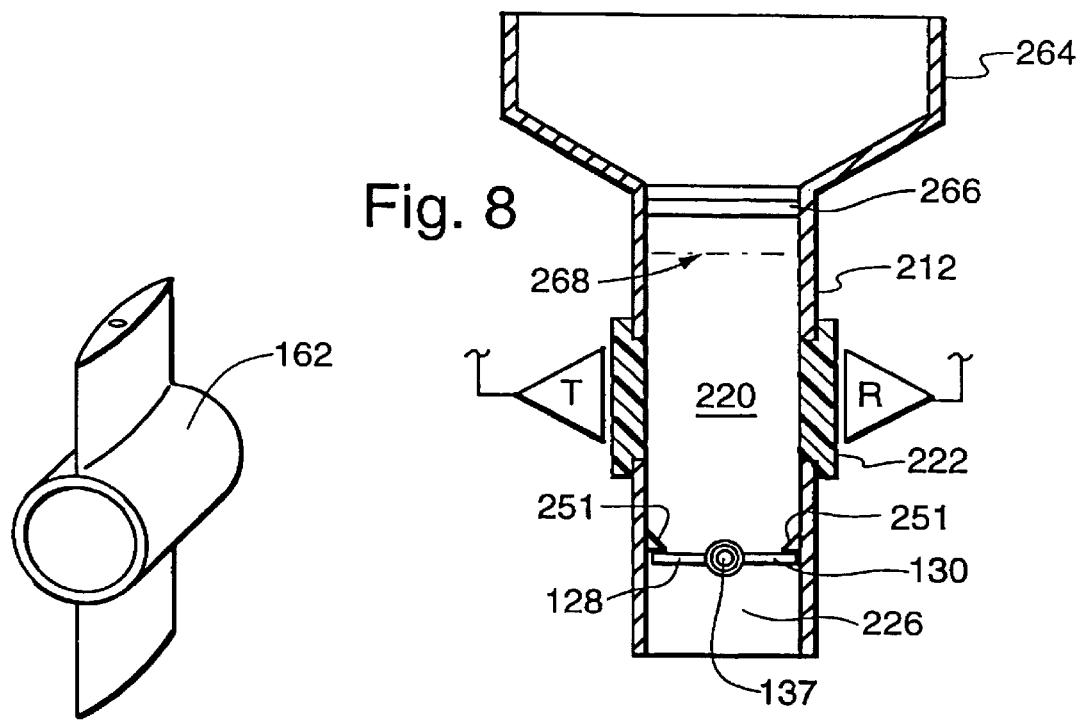
Fig. 8
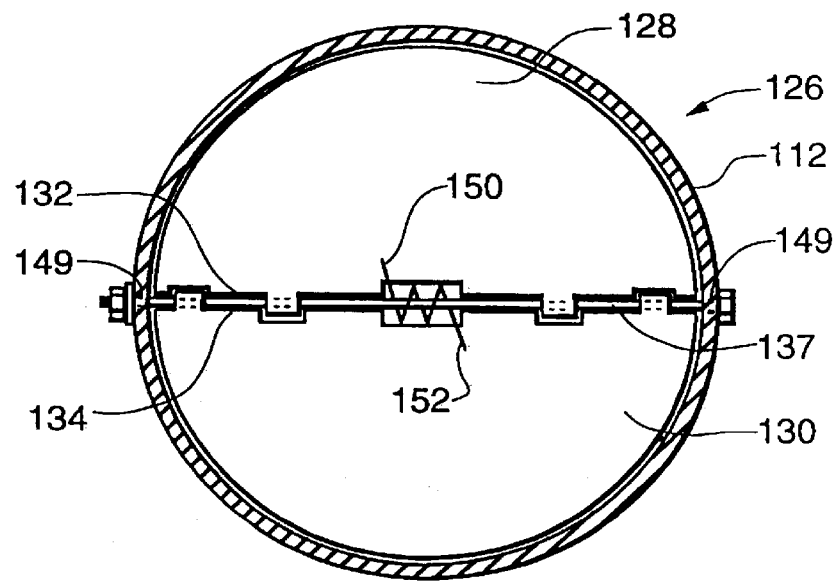
Fig. 6
Fig. 7

SENSOR APPARATUS WITH BUTTERFLY VALVE FOR MAINTAINING PACKING DENSITY OF MOVING MATERIAL

FIELD OF THE INVENTION

The present invention relates to a sensor of the type used in agricultural harvesters to sense characteristics of harvested crop material such as corn, soybeans, wheat, rice, oats, edible beans, and forage crops as the crop material moves through a feed tube that passes through a sensing region. The sensor may also be used in a static installation such as a grain storage elevator, and as a laboratory test apparatus. The invention provides a butterfly valve for assuring a constant packing density of the crop material in the sensing region where a non-contact sensor senses characteristics of the crop material.

BACKGROUND OF THE INVENTION

It is well known to provide an agricultural harvester with a non-contact sensor disposed adjacent a crop material feed tube for determining a crop material characteristic such as, for example, crop moisture content and/or crop density, as the crop material is being conveyed through the feed tube by an auger. The sensor may be an RF microwave sensor as disclosed by Hamid and Stuchly in the publication IEEE Transactions on Industrial Electronics and Control Instrumentation, Vol. IECI-22, May, 1975, or a capacitance or inductance sensor as disclosed in U.S. Pat. No. 5,092,819 to Schroeder et al.

In order to develop an accurate indication of the crop material characteristics being measured, these sensors require a constant packing density of the crop material as it moves through a sensing region. Schroeder et al. teaches the use of a broken flight auger, that is, an auger with a flighting section of reduced diameter in the sensing region, to obtain a more uniform packing. In the case of RF microwave sensors, it is conventional to provide a broken flight auger with that portion of the auger flighting which would otherwise extend through the sensing region entirely removed. This not only avoids modulation of the sensing signal by the rotating flighting but also produces a more uniform packing density of the crop material in the sensing region.

When a broken flight auger is used, the auger flight section upstream of the sensing region conveys the crop material into the sensing region where it accumulates until the sensing region is filled to some level which, for a given crop material, is dependent on the inclination of the feed tube at the sensing region. Thereafter, as more crop material is conveyed into the sensing region by the upstream flighting, it forces crop material out of the sensing region and into the auger flight section, if any, downstream of the sensing region. The crop material in the sensing region is thus packed to a density that is more uniform than would exist if the crop material was conveyed through the sensing region by unbroken flighting.

As long as the feed tube is inclined upwardly in the downstream direction by about 20° or more relative to horizontal, the broken flight auger results in a packing density which is sufficiently constant to permit reasonably accurate sensing of the crop material characteristics. However, when the feed tube is horizontal, inclined downwardly in the downstream direction, or inclined upwardly by less than about 20°, the packing density of the crop material in the sensing region will vary sufficiently to result in inaccurate measurements of the characteristics.

The problem of maintaining a constant packing density also exists in other applications, such as in a laboratory test apparatus or a measurement apparatus in a grain storage elevator. In these applications the non-contact sensor is disposed adjacent a vertically oriented feed tube and the crop material is permitted to fall through the feed tube and sensing region under the force of gravity. As the crop material falls, it does not distribute uniformly across the width of the tube. It tends to fall in clusters and even within these clusters the material is not uniformly distributed.

A prior art solution to the problem has been to provide a funnel or fixed flow restrictor located downstream of the sensing region so that the crop material backs up and fills the sensing region. While this arrangement may be suitable for a laboratory test apparatus, it is not suitable for use in harvesters. Since the flow restrictor is fixed, it can not be varied to accommodate different crop flow rates as are encountered when harvesting a field having some areas where the crop is thick and other areas where the crop is light or thin. The flow restrictor must be chosen such that it causes crop to back up into the sensing region even when harvesting the lightest crop. The restrictor thus unduly limits the crop flow rate when areas of thick crop are being harvested.

SUMMARY OF THE INVENTION

An object of the present invention is to provide a sensor apparatus having a variable crop flow controller operable by crop material moving through a feed tube to maintain a substantially constant packing density of the crop material in a region of the tube where a characteristic of the crop material is sensed, regardless of the orientation of the feed tube.

Another object of the present invention is to provide an improvement in a sensor apparatus having a sensor disposed at a sensing region for sensing at least one characteristic of a crop material moving in a downstream direction through a feed tube that extends along an axis through the sensing region, the improvement comprising a variable flow controller disposed in the feed tube downstream of the sensing region, the flow controller being responsive to the crop material for variably restricting the flow of crop material from the sensing region so that the packing density of the crop material in the sensing region remains substantially constant.

A further object of the invention is to provide a sensing apparatus for sensing a characteristic of a crop material and including an auger with a shaft and flighting rotatable within a crop material feed tube, the auger having no flighting along a section of the shaft rotating within a sensing region, the sensing apparatus including a butterfly valve mounted on the shaft downstream of the sensing region for variably controlling the rate of flow of crop material from the sensing region.

Yet another object of the invention is to provide, in an agricultural harvester, the combination comprising: a sensor disposed at a sensing region for sensing a crop material characteristic; a crop material feed tube extending through the sensing region; an auger comprising a rotatable shaft having flighting thereon for conveying crop material through the feed tube in a downstream direction, the flighting terminating at a downstream end which is upstream relative to the sensing region whereby crop material conveyed into the sensing region by the flighting is pushed through and from the sensing region by further crop material conveyed into the sensing region; and a butterfly valve disposed on the shaft downstream of the sensing region, the butterfly valve being movable from a closed to an open position by crop material pushed from the sensing region.

The flow controller or butterfly valve comprises two semi-circular flaps hinged together along diametral edges by hinge pin means extending through the wall of a crop material feed tube. In one embodiment the flow controller is mounted on an auger shaft and flaps are provided with channels which permit the flaps to partially surround the shaft when the controller is in an open position.

Other objects and advantages of the invention and the manner of making and using it will become evident upon consideration of the following description and the accompanying drawings.

BRIEF DESCRIPTION OF THE DRAWINGS

FIG. 5 shows a second embodiment of the invention wherein the butterfly valve is located downstream of all auger flighting;

FIG. 6 is a perspective view of a bearing support for the auger shaft;

FIG. 7 is a sectional view taken along the line 7—7 of FIG. 5 and showing a second embodiment of the butterfly valve in its fully closed position; and, FIG. 8 illustrates a third embodiment of the invention wherein the crop material is moved through the feed tube by the force of gravity.

DESCRIPTION OF PREFERRED EMBODIMENTS

Figure 1:
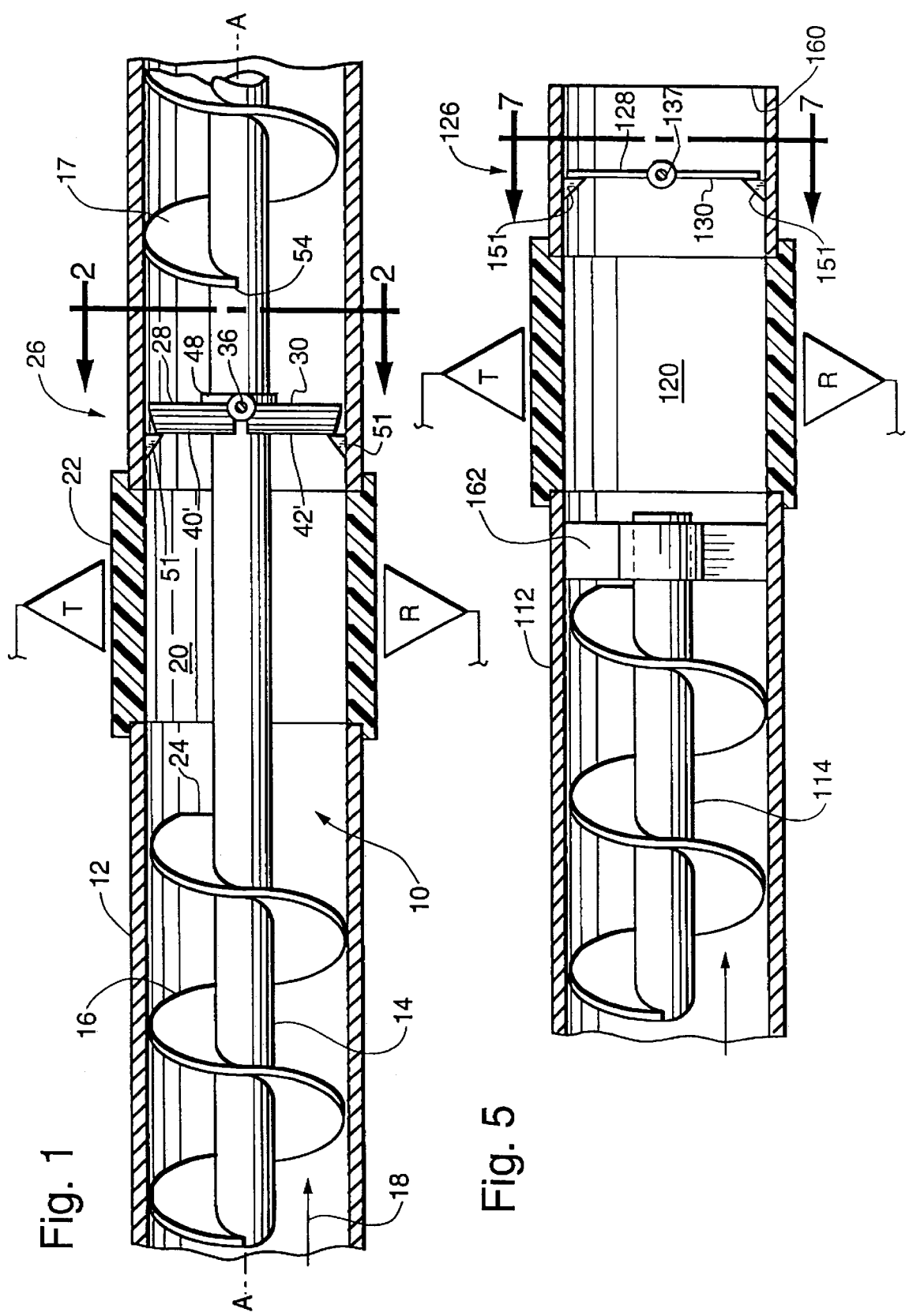
FIG. 1 illustrates the sensing region of a non-contact sensor for sensing crop material characteristics as the crop material is moved through a crop feed tube by a broken flight auger, the feed tube being shown in section to reveal the auger and a butterfly valve.

As illustrated in FIG. 1, a first embodiment of a sensor apparatus for sensing at least one characteristic of a crop material comprises an auger 10 disposed within a crop material feed tube 12 of an agricultural harvester, the feed tube being circular in section. The auger comprises a rotatable shaft 14 having first and second sections 16,17 of auger flighting attached thereto for conveying crop material entering the feed tube at an upstream end (left end in FIG. 1) downstream in the direction indicated by arrow 18 toward the downstream end of the tube. The crop material feed tube may be inclined upwardly or downwardly in the downstream direction, or disposed horizontally within the harvester.

A conventional non-contact sensor T,R is provided adjacent the crop material feed tube for sensing a characteristic or characteristics of the crop material, such as its density and/or its moisture content, as the crop material moves through a sensing region 20. In a preferred embodiment the sensor may be a microwave sensor having a transmitter T disposed on one side of feed tube 12 for transmitting a microwave signal through the sensing region and a receiver R disposed on the opposite side of the feed tube for receiving the signal. It is well known that the moisture content and density of crop material in the sensing region may be determined from the attenuation and phase shift imparted to the transmitted signal as it passes through the crop material.

Feed tube 12 is provided with a tube section 22 at the sensing region, the tube section being made of a plastic or other material which is transparent to, that is, has minimal or no effect on, signals in the range of the frequency of the transmitted signal. The auger flighting section 16 terminates at a downstream edge 24 which is upstream of the sensing region 20 so that rotation of the flighting does not impose a modulation on the sensing signal transmitted by transmitter T.

Figure 2:
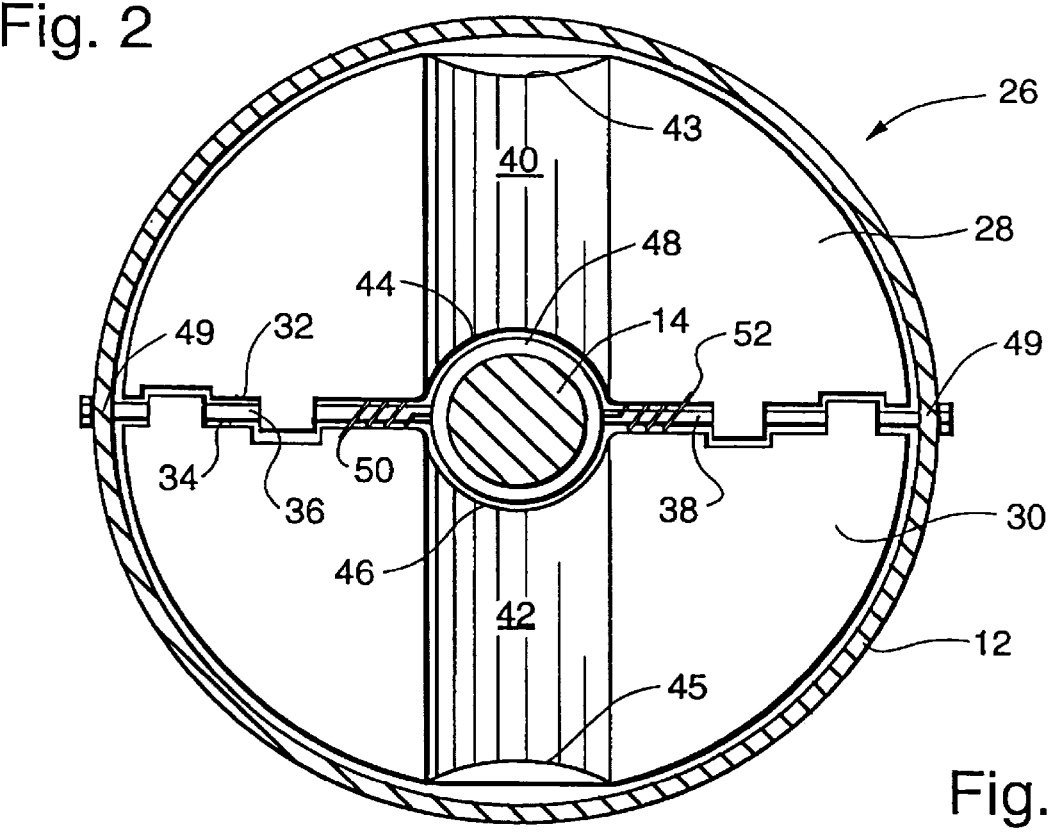
FIG. 2 is a sectional view taken along the line 2—2 of FIG. 1 and showing a first embodiment of the butterfly valve in its fully closed position.
Figure 3:
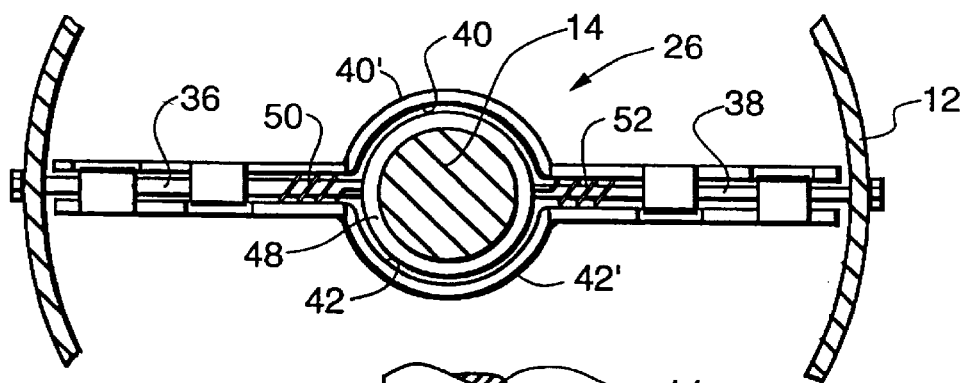
FIG. 3 shows the butterfly valve in its fully opened position as viewed from a point downstream of the valve.
Figure 4:
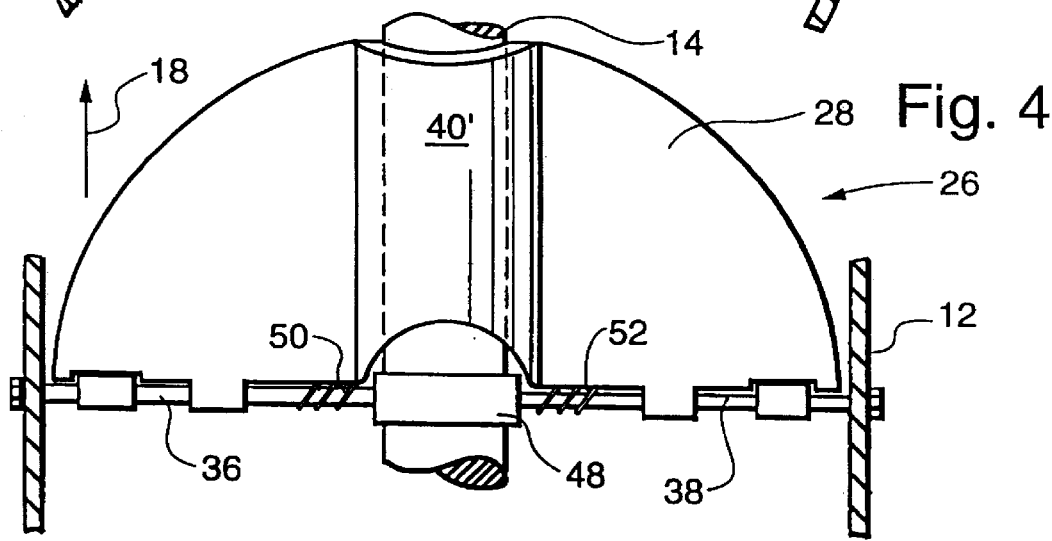
FIG. 4 is a top view of the butterfly valve in its fully opened position.

In accordance with the present invention, a variable flow controller 26 is provided downstream from sensing region 20 for controlling the packing density of crop material in the sensing region by controlling or regulating the flow of crop material from the sensing region. Controller 26 may take the form of a butterfly valve as illustrated in FIGS. 2–4.

The butterfly valve comprises two generally planar semi-circular flaps 28,30 hinged together along diametral edges 32, 34 by two hinge pins 36,38. Flaps 28,30 are stamped or otherwise shaped to provide respective channels or recesses 40,42 in one side with corresponding ridges 40', 42' on the opposite side. The channels face downstream when the flaps are in their valve-closed positions shown in FIGS. 1 and 2.

Each ridge extends normal to the diametral edge. The ridges do not extend entirely to the diametral edges. Instead, the diametral edges and portions of the ridges near the diametral edges are cut away as indicated at 44 and 46 (FIG. 2) so that the hinged flaps may extend around auger shaft 14 when the flaps are in the valve-closed position. Shaft 14 is received into channels 40,42 as the flaps are moved away from the valve-closed position so that the flaps almost completely encircle the shaft over the length of the channels when the valve is fully open as shown in FIG. 3.

As subsequently described, two springs 50,52 bias the flaps 28,30 toward the fully closed position. Depending on the diameter of the auger shaft 14 and the clearance permitted between the peripheral edges of the flaps and the interior wall of the feed tube 12, the outer ends of ridges 40', 42' may engage the wall slightly before the flaps reach the fully open position. The outer ends of the ridges may be cut away as indicated at 43,45 to prevent this.

One end of each hinge pin 36,38 is welded or otherwise secured to a bearing means 48 mounted on the auger shaft 14. The bearing means may take any known form which permits rotation of the shaft without driving the hinge pins. For example, the bearing means may be a bearing block in which shaft 14 rotates, or it may comprise a sealed ball or roller bearing having an outer race to which the hinge pins are affixed and an inner hub rotating with the shaft.

The opposite or outer end of each hinge pin is secured to the feed tube to prevent rotation of the flaps 28,30 as shaft 14 rotates. In one embodiment, the hinge pins may extend through holes 49 (FIG. 2) and have a threaded end portion which is screwed into the bearing means 48 to secure the hinge pins to the bearing means.

Two torsion springs 50,52 bias the flaps 28,30 toward a first or fully closed position (FIG. 2) where the flaps form a generally flat circular obstruction extending generally normal to shaft 14 and having a diameter only slightly less than the internal diameter of feed tube 12. In this position the valve blocks practically all flow of crop material from the sensing region 20. The bias force of springs 50,52 is chosen such that the flaps 28,30 remain in the fully closed position against flap stops 51 (FIG. 1) until the crop material in the sensing region is packed to a desired density. The hinge pins 36,38 extend horizontally and the spring biasing the lower flap 30 is stronger than the spring biasing the upper flap 28. This prevents the lower flap, upon which the crop material exerts a greater force, from opening prematurely, that is, before the crop material in sensing region 20 has reached the desired packing density.

Flap stops 51 are secured to the interior wall of feed tube 12 and prevent the forces of the torsion springs 50,52 from moving the flaps past the fully closed position. Flap stops 51 may not be required. If the ridges 40'42' are not cut away at 43,45 they may engage the interior wall of feed tube 12 as described above and thus prevent the flaps from moving past the fully closed position.

The channels 40,42 permit the flaps to envelop the shaft 14 to a degree dependent on the rate of crop flow from the sensing region 20. In periods of high flow volume the flaps may align with the direction of flow in a second or fully opened position as shown in FIG. 3.

During a harvesting operation the variable flow controller or butterfly valve 26 insures a substantially constant packing density of crop material in the sensing region 20 regardless of the angle at which the feed tube 12 is mounted in the harvester and regardless of changes in inclination of the feed tube as a result of harvester movement over uneven terrain. The valve flaps 28,30 are biased to the fully closed position as shown in FIGS. 1 and 2 as the auger 14 conveys into the sensing region 20 a sufficient accumulation of crop material to begin pushing against the upstream surfaces of flaps 28,30. When the desired packing density of the crop material in the sensing region is reached, the pressure of the crop material against the flaps overcomes the bias of torsion springs 50,52, and the flaps pivot about hinge pins 36,38 to partially or fully open positions depending on the volume of crop flow. This permits crop material to be pushed from the sensing region and through the valve into the second section 17 of auger flighting which has an upstream end 54 located downstream of the valve 26 by a distance such that the flighting will not interfere with the operation of flaps 28,30.

As the rate of flow of crop material into the sensing region increases or decreases, the flaps 28,30 move more toward the opened or closed position, respectively. This permits a greater or lesser flow from the sensing region 20 so that the packing density of the crop material therein is maintained substantially constant.

FIG. 1 illustrates an embodiment wherein the sensing region 20 is located intermediate the ends of the feed tube 12 and between two sections of auger flighting. FIG. 5 illustrates a second embodiment wherein a sensing region 120 is located near the end 160 of the feed tube and downstream of all auger flighting, as might be the case where the characteristics of the crop material are sensed immediately before the crop material is dumped into a storage bin or onto an elevator. In FIG. 5, the auger shaft 114 has a downstream end located upstream relative to the sensing region 120 and the variable flow controller or butterfly valve 126 is secured to the feed tube 112 between the sensing region and the downstream end 160 of the feed tube. A bearing support 162 supports the downstream end of auger shaft 114. As shown in FIG. 6, the bearing support has an airfoil or streamlined shape to minimize its resistance to crop flow.

As shown in FIG. 7, the butterfly valve 126 comprises two flat semi-circular flaps 128, 130 hinged together along diametral edges 132,134 by a single hinge pin 137. The hinge pin extends horizontally and through holes 149 on opposite sides of feed tube 112. Two bias springs 150,152 differentially bias the flaps against stops 151 in the same manner as described with reference to the embodiment of FIG. 1.

The butterfly valve 126 operates in the same way as the valve 26 to maintain the desired packing density in the sensing region.

FIG. 8 illustrates a further embodiment of the invention suitable for use in a static installation such as a laboratory or a test station at a grain storage elevator. In this embodiment the crop feed tube 212 is oriented vertically or nearly vertically so that crop material moves downwardly under the force of gravity. A hopper or storage bin 264 is provided at the top or upstream end of the feed tube to hold a quantity of the crop material to be tested and a conventional gate 266 may be provided for releasing the contents of the hopper into the feed tube. The feed tube is provided with a plastic section 222 and a sensor T,R at the sensing region 220 as in the previously described embodiments.

A variable flow controller or butterfly valve 226, similar to the valve 126 shown in FIG. 7, is mounted in the feed tube 212 downstream from the sensing region 220. The difference between valves 126 and 226 is that the bias springs in valve 226, corresponding to springs 150,152, apply equal bias forces to the two flaps 128, 130, these bias forces being great enough to hold the flaps against the bottom sides of flap stops 251. Since the springs apply equal bias forces to the flaps, they may be replaced by a single spring having one end acting against one flap and the opposite end acting against the other flap.

To use the sensing apparatus of FIG. 8, the hopper 264 is filled with a sample of the crop material to be tested and the gate is opened to permit the crop material to flow into the feed tube 212. The crop material accumulates on the upper surfaces of flaps 128, 130 and fills the feed tube to a level 268 above the sensing region 220. At this point the weight of the crop material pressing on the upper surfaces of flaps 128, 130 overcomes the spring bias forces holding the flaps against stops 251 and the flaps open partially to permit crop flow past the flaps. Thereafter, as the rate of crop flow into the feed tube increases or decreases the flaps open or close so as to maintain the accumulation of crop material on the flaps at the level 268. Thus, the sensing region 220 is always filled with crop material packed to a uniform density across the diameter of the feed tube.

Although specific preferred embodiments have been described in detail to illustrate the invention, it will be understood that various modifications and/or substitutions may be made in the described embodiments without departing from the spirit and scope of the invention as defined by the appended claims. For example, in the embodiment shown in FIG. 8, the feed tube may be rectangular in section in which case the flaps should each be rectangular in shape.

We claim:

1. In a sensor apparatus having a sensor disposed at a sensing region for sensing at least one characteristic of a crop material moving in a downstream direction through a feed tube that extends along an axis through the sensing region, the improvement comprising means for maintaining crop material entering the sensing region at a substantially constant packing density, said means comprising a variable flow controller disposed in said feed tube downstream of the sensing region, said flow controller being responsive to said crop material for variably restricting the flow of crop material from the sensing region.

2. The improvement as claimed in claim 1 wherein said flow controller comprises first and second flaps hinged together along a diametral edge by hinge pin means, said hinge pin means extending through a wall of said feed tube to support said flaps, the flaps being pivotable about said hinge pin means between a closed position in which the flaps lie substantially normal to the axis of the feed tube and an opened position in which the flaps lie substantially parallel to said axis; and spring means for applying biasing forces to said flaps tending to move said flaps toward the closed position.

3. The improvement as claimed in claim 2 wherein the spring means comprises first and second springs for applying bias forces of different magnitudes to the first and second flaps, respectively.

4. The improvement as claimed in claim 2 wherein said hinge pin means extends horizontally so that the first flap is below the second flap, and said spring means applies to the first flap a bias force greater than the bias force applied to the second flap.

5. The improvement as claimed in claim 2 wherein the feed tube is substantially vertically oriented and gravity moves said crop material through the feed tube, the weight of crop material on said flaps moving said flaps against said bias forces so that crop material may flow past said flaps.

6. The improvement as claimed in claim 2 and further comprising an auger rotatable within the feed tube to move said crop material through the feed tube, said auger including a shaft with a section of flighting thereon, the flighting and shaft having downstream ends that are upstream relative to said sensing region.

7. The improvement as claimed in claim 2 and further comprising an auger rotatable within the feed tube to move said crop material through the feed tube, said auger including a shaft with first and second sections of flighting thereon, the first section of flighting having a downstream end that is upstream relative to said sensing region and the second section of flighting having an upstream end that is downstream relative to said flaps.

8. The improvement as claimed in claim 2 wherein said feed tube is circular in section and said flaps are semi-circular.

9. A sensor apparatus as claimed in claim 1 wherein said feed tube is a feed tube in an agricultural harvester.

10. A sensor apparatus for sensing at least one characteristic of a crop material being conveyed through a feed tube by an auger having broken flighting at a sensing region, the apparatus being characterized in that it includes means for maintaining crop material entering the sensing region at a substantially constant packing density, said means comprising a flow controller disposed downstream of the sensing region for restricting the flow of crop material from the sensing region, said flow controller being operable by crop material pushed from the sensing region by further crop material entering the sensing region.

11. A sensing apparatus for sensing at least one characteristic of a crop material, the sensing apparatus including an auger for conveying crop material in a downstream direction through a crop material feed tube, the auger comprising at least a first flighting section terminating at a downstream end which is upstream of a sensing region having an associated sensor, and a means for maintaining crop material entering the sensing region at a substantially constant packing density, said means comprising a variable flow controller mounted within said feed tube at a position downstream of the sensing region, the flow controller being responsive to the crop material for controlling downstream flow of the crop material from the sensing region.

12. A sensing apparatus as claimed in claim 11 wherein said flow controller comprises two generally planar semi-circular flaps each having a diametral edge, the flaps being pivotally connected together at their diametral edges by hinge means, and spring means biasing said flaps to positions where they restrict the flow of crop material from the sensing region.

13. A sensing apparatus as claimed in claim 11 wherein said auger further comprises a rotatable shaft on which the flighting is mounted, said shaft extending downstream of said sensing region, said flow controller being mounted on said shaft.

14. A sensing apparatus as claimed in claim 13 wherein said flow controller is mounted on said shaft by mounting means permitting rotation of said shaft relative to said flow controller.

15. A sensing apparatus as claimed in claim 14 wherein said mounting means comprises a bearing and hinge pins pivotally hinging the semi-circular flaps together at their diametral edges, the hinge pins being secured to said bearing.

16. A sensing apparatus as claimed in claim 13 wherein each of said flaps has a ridge on one side and a corresponding channel on an opposite side, the channel on each flap extending from a peripheral edge of the flap toward the diametral edge of the flap in a direction normal to the diametral edge whereby, when said flaps are pivoted on said hinge means, the channels form a passage through which the shaft extends.

17. A sensor apparatus comprising, a sensor disposed at a sensing region for sensing a crop material characteristic; a crop material feed tube extending through the sensing region; an auger comprising a rotatable shaft having flighting thereon for conveying crop material through the feed tube in a downstream direction, the flighting terminating at a downstream end which is upstream relative to the sensing region whereby crop material conveyed into the sensing region by the flighting is pushed through and from the sensing region by further crop material conveyed into the sensing region; and a means for maintaining crop material entering the sensing region at a substantially constant packing density, said means comprising a variable flow controller disposed on the shaft downstream of the sensing region, the variable flow controller being spring biased to a closed position in which it blocks flow of crop material from the sensing region, the variable flow controller being movable from the closed position to an open position by crop material pushed from the sensing region.

18. A sensor apparatus as claimed in claim 17 wherein the variable flow controller comprises a butterfly valve having two generally planar semi-circular flaps each having a diametral edge, the flaps being pivotally hinged together at their diametral edges by hinge pins extending normal to the shaft.

19. A sensor apparatus as claimed in claim 18 wherein each of said flaps has a ridge on one side and a corresponding channel on an opposite side, the channel on each flap extending from a peripheral edge of the flap toward the diametral edge of the flap in a direction normal to the diametral edge whereby, when said flaps are pivoted on said hinge to open the valve, the channels form a passage through which the shaft extends.

20. A sensor apparatus as claimed in claim 17 wherein said feed tube is a feed tube in an agricultural harvester.

\* \* \* \* \*